Oct. 17, 1967 E. I. VALYI 3,347,965
METHOD AND APPARATUS FOR MOLDING PLASTIC BOTTLES
Filed July 8, 1964 2 Sheets-Sheet 1
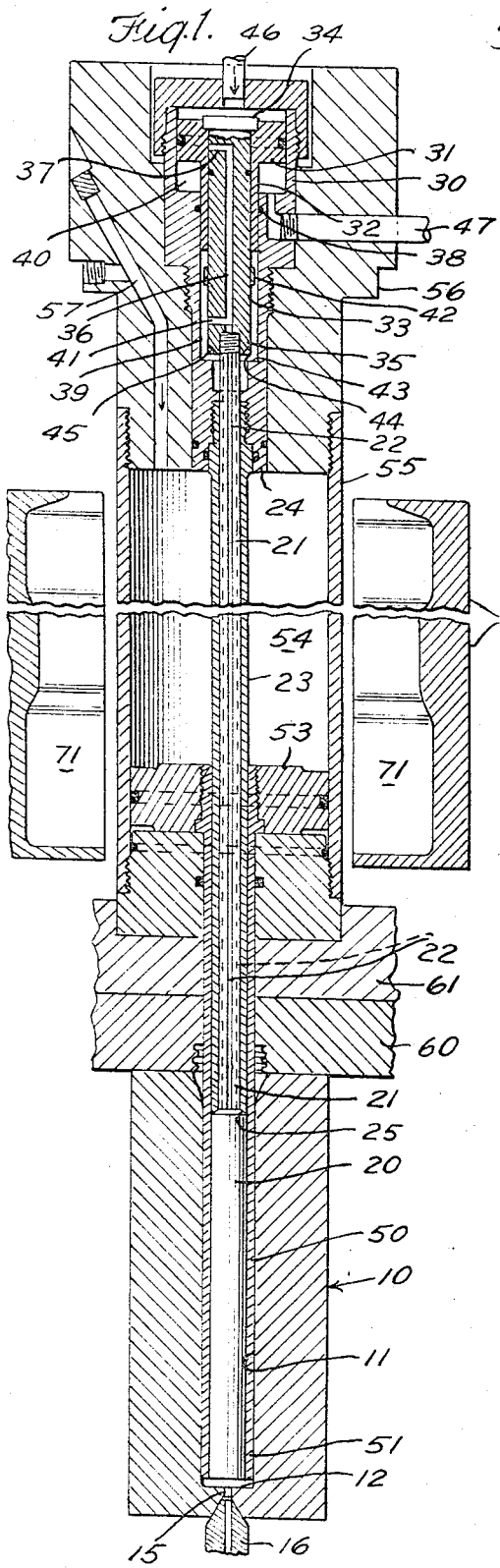
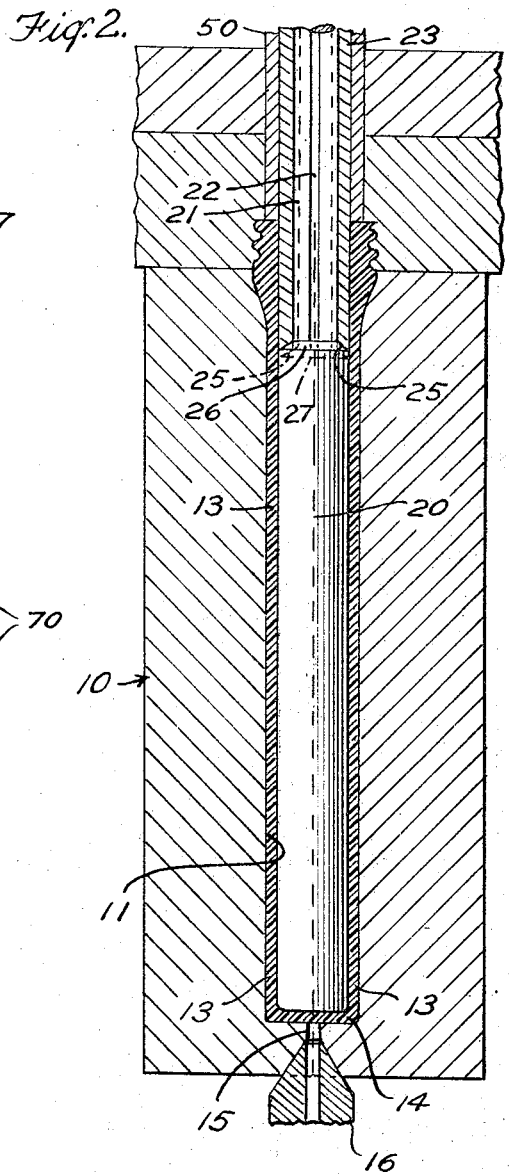
INVENTOR
EMERY I. VALYI
BY
N. L. Leek
ATTORNEY

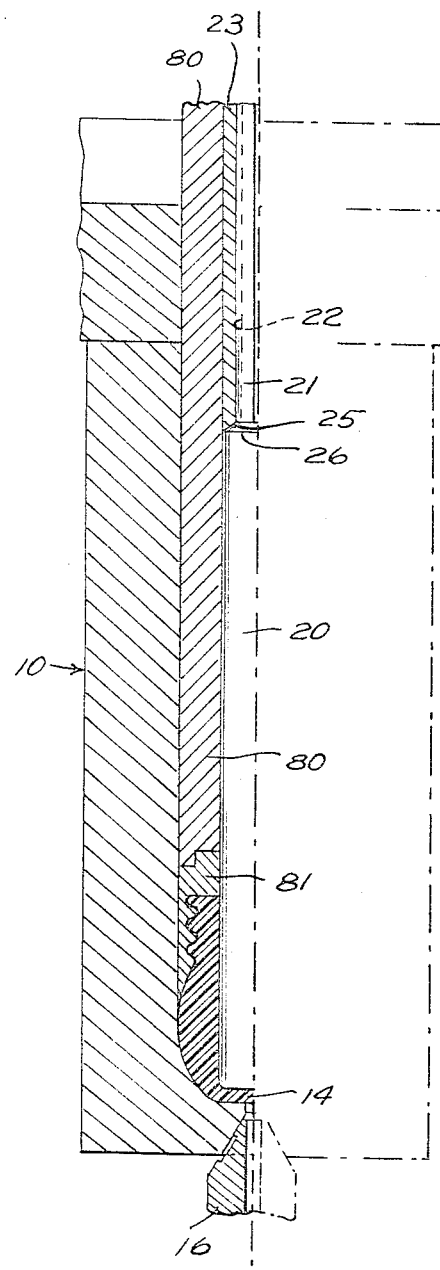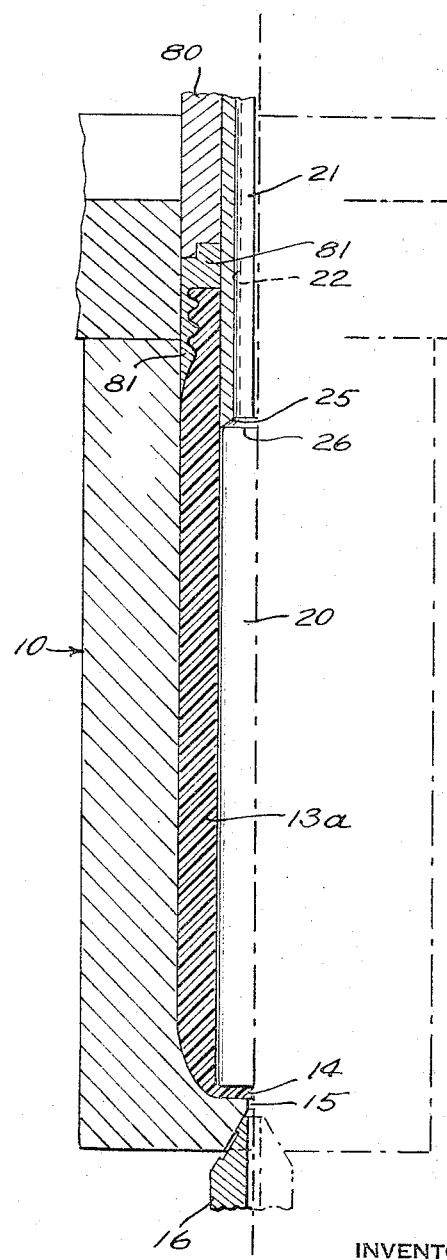

United States Patent Office 3,347,965
Patented Oct. 17, 1967

3,347,965
METHOD AND APPARATUS FOR MOLDING PLASTIC BOTTLES
Emery I. Valyi, 5200 Sycamore Ave., Bronx, N.Y. 10471
Filed July 8, 1964, Ser. No. 381,174
6 Claims. (Cl. 264—97)

This invention relates to a method and apparatus for blow-molding articles of organic plastic material.

Apparatus of this general type is shown in my U.S. Patent No. 3,029,468 dated Apr. 17, 1962. That patent shows an injection nozzle aligned with a parison die in which a parison is formed around a blow core. The blow core with the parison thereon is then retracted into a blow mold which is then closed and the parison expanded by fluid pressure into its final form.

When the blow core is relatively long and slender, difficulty is frequently encountered in maintaining the blow core accurately centered with respect to the parison die. The fortuitous distribution of forces acting upon the blow core in the course of injecting the parison tends to deflect the core resulting in a parison having unpredictable variations in wall thickness.

It is an object of this invention to provide novel and improved means for accurately and positively centering the above elements during the injection of the parison.

Another object is to provide a blow mold and parison die of the above type having improved details or construction.

Other objects and advantages will be apparent as the nature of the invention is more fully disclosed.

The nature of the invention will be better understood from the following description, taken in connection with the accompanying drawing in which a specific embodiment has been set forth for purposes of illustration.

In the drawings:

FIG. 1 is an axial section of a molding apparatus embodying the present invention;

FIG. 2 is a similar section, on a larger scale, of the parison die station;

FIG. 3 is a partial section similar to FIG. 2 illustrating a further embodiment of the invention with the parts in initial injection position;

FIG. 4 is a partial section similar to FIG. 3 showing the members in the final injection position with the injected parison therein.

Referring to the drawings more in detail the invention is shown as emodied in an apparatus for injection molding a parison prior to blowing the same into bottle form in a blow mold. The apparatus is shown as comprising a split parison mold or die 10 having side surfaces 11 and bottom surface 12 adapted to form the outer surfaces of the sides 13 and bottom 14 of a parison. The bottom surface 12 is formed with an orifice 15 registering with an injection nozzle 16 through which the organic plastic is injected for forming the parison. The split parison die is adapted to be opened to release the formed parison at the end of the injection cycle. The inner surfaces of the sides 13 and bottom 14 of the parison are formed on a blow core 20 which registers with the parison die. The blow core 20 is carried by a stem 21 having a fluted outer surface. A tube 23 is disposed around the stem 21 to form with the fluted outer surface of the stem 21 a series of longitudinal air passages 22 for the blow air. The tube 23 is fixed at its upper end to a housing 24 and terminates at its lower end in a tapered shoulder 25 registering with a similar tapered shoulder 26 at the upper end of the core 20. The arrangement is such that when the surfaces 25 and 26 are in contact, the lower ends of the air passages 22 are closed but when the core is advanced with respect to the tube 23 an annular discharge passage or port 27 is formed between the spaced surfaces 25 and 26 through which blow air is to the interior of the parison.

The upper end of the housing 24 forms a cylinder 30 in which a piston 31 slides. The piston 31 has a hollow stem 32 through which a rod 33 extends. The rod 33 carries a head 34 adapted to rest on the top of the piston 31 and its lower end 35 is attached to the stem 21. The rod 33 is provided with an axial passage 36 communicating below the head 34 with a radial passage 37 which is adapted to be closed by the piston 31 when the head 34 is seated thereon but is open to the cylinder 30 above the piston 31 when the piston 31 is depressed. The hollow piston stem 32 slides in a sealing ring 38 which divides the cylinder 30 into a lower chamber 39 and an intermediate chamber 40 below the piston 31. The lower end of the passage 36 communicates through a radial passage 41 with the chamber 39 below the sealing ring 38. The lower end of the stem 32 engages a collar 42 on the rod 33 to move the rod 33 together with the fluted stem 21 and core 20 downwardly after the piston 31 has moved a distance to open the air passage 37. The lower end 35 of the rod 33 engages a stop 43 on the housing 24 to limit the downward stroke of the piston and of the core 20 and thus limit the width of the annular air passage 27 formed between the surfaces 25 and 26 due to relative movement of the core and tube 23. The under surface 44 of lower end 35 of the rod 33 is formed with flutes 45 to establish communication between the chamber 39 and the air passages 22.

Air for actuating the piston 31 is supplied to the cylinder 30 above the piston 31 by a supply passage 46 and air for restoring the piston is supplied to the chamber 40 by a passage 47.

The arrangement is such that when the piston 31 is depressed to open the passage 37 air is supplied from the cylinder 30 through the axial pasasge 36 to the chamber 39 and through the passages 22 and the annular passage 27 to the interior of the parison on the core 20. When the piston 31 is raised the annular passage 27 is closed.

A centering sleeve 50 fits slidably around the core 20 and the tube 23 with its lower end 51 near the lower end of the core 20 when the sleeve 50 is in its lower position. Sleeve 50 has an outside contour such as to touch the inner walls of the parison die and thereby prevent sidewise movement of core 20. At its upper end the sleeve 50 is attached to a ring piston 53 sliding in an annular chamber 54 formed between the tube 23 and a housing 55. The housings 24 and 55 are carried by a cross head 56 by which the entire core assembly is adapted to be raised and lowered. Air or other pressure fluid for depressing the ring piston 53 is supplied to the annular chamber 54 by a passage 57.

A neck ring 60 is mounted on a carrier 61 attached to the housing 55 in a position such that the neck ring 60 registers with the upper end of the parison die 10 to form the neck of the parison. The lower end 51 of the centering sleeve 50 is adapted to be positioned above the neck ring 60 when the sleeve is in its upper position and is shaped to define the upper surface of the neck of the parison.

A split blow mold 70 is disposed in a blow position above the parison die 10 and is formed with bottle cavities 71 to be closed around the parison when the latter is raised on the blow core into blow position.

In operation, the blow core is brought into parison forming position within the parison die 10 by suitable lowering of the crosshead 56 and the centering sleeve 50 is brought into its lower position by applying air pressure to the annular chamber 54 through the air passage 57. The air pressure is maintained such that the sleeve 50 is retracted by the pressure of the injected plastic material as the parison die is filled with the plastic injected through the nozzle 16. The centering sleeve prevents deflection of core 20 as plastic is injected through nozzle 16. As the centering sleeve is retracted the core 20 remains supported and maintained centered partly by the sleeve and partly by the plastic material so that the core is supported at all times throughout the entire injection step. Hence the parison sides 13 are maintained of uniform thickness around their entire periphery. To apply pressure upon the plastic during or after filling of the injection mold suitable fluid pressure is applied in annular chamber 54. Thereby the pressure on the plastic may be controlled during filling of the mold and thereafter, while the parison cools and tends to shrink.

After the parison has been formed the entire core assembly with the parison thereon is shifted axially into blow position by suitable actuation of the cross head 56. The blow mold 70 is then closed around the parison in known manner and air is supplied to the cylinder 30 to depress the piston 31. This movement of the piston opens the air passage 37 and depresses the core 20 to open the annular passage 27 for blow air as above described. After the bottle has been formed the blow core is extracted and the bottle ejected from the blow mold 70 in the usual manner.

In the embodiment of FIGS. 1 and 2 above described, the sleeve 50 is adapted to slide within the neck ring 60. In some instances, it may be desirable to use a neck ring of smaller diameter as illustrated in FIGS. 3 and 4 which are sectional figures taken on one side of the center line, it being understood that the members on the other side of the center line are mirror images of those shown in the figures.

In FIGS. 3 and 4, the parts which are identical with those of FIGS. 1 and 2 have been given the same reference numbers and the description thereof will not be repeated. It is understood, however, that the arrangement of the parts is identical with that previously described with the exception of the centering sleeve 80, which in this embodiment carries at its lower end a neck ring 81 which is adapted to define the outer surface of the neck of the parison.

When the centering sleeve 80 and the neck ring 81 are in their lower positions as shown in FIG. 3, the injected plastic material first enters the neck ring and as the parison die becomes filled, the neck ring together with the centering sleeve 80 is gradually raised until it reaches an upper position above the parison die 10 as shown in FIG. 4. When the blow core and associated parts are raised into blow position, the neck ring continues to confine the neck of the parison while the bottle is being blown. After the bottle has been blown, it may be removed from the neck ring in any suitable manner; for example, if the neck ring is formed with a threaded inner surface, the bottle may be unscrewed from the neck ring by rotating either the bottle or the neck ring. If desired, the neck ring may be separated from the centering sleeve 80 while still on the formed bottle so as to facilitate the removal of the neck ring from the bottle. The centering sleeve 80 has been shown in FIGS. 3 and 4 as of substantial thickness for forming a parison having sides 13a which are relatively thick compared to its neck. It is obvious, however, that this particular construction is shown for purposes of illustration and that the thickness of the parison sides and of the centering sleeve may vary in accordance with the desired product. Thus, whenever a non-uniform contour of the parison mold or of the blow core is required, the sleeve will nevertheless provide adequate support, although it may not contact the parison mold or the blow core over its entire periphery.

What is claimed is:

1. The method of molding a parison or the like of organic plastic material in a mold composed of an outer member, a blow core having a free end projecting into said outer member and having a blow port adapted to supply fluid pressure for expanding the parison into a blow mold cavity and having sides spaced from said outer member to form a mold cavity therebetween and a neck ring disposed to form an extension of the mold cavity which comprises introducing into said mold cavity a sleeve adapted to center and support said core therein, injecting said organic plastic material into said cavity at the free end of said sleeve and retracting said sleeve along said core as said material is injected, while causing said sleeve to maintain a predetermined pressure upon the injected plastic material as the mold is filled and shifting the blow core and neck ring with the formed parison into a blow zone wherein the parison is expanded to form a hollow object.

2. An apparatus for forming a parison of organic plastic material comprising a parison mold having an outer member containing an injection orifice and a blow core spaced from the walls of said outer member to form a mold cavity therebetween, a sleeve disposed around said blow core and extending into said mold cavity for supporting and centering the blow core in said parison mold, said sleeve in its lower postion extending substantially to the end of said blow core and in retracted position forming an end closure for said mold cavity, pressure means for advancing said sleeve to its lower position, said pressure means being adapted to permit the retraction of said sleeve under a predetermined pressure as the parison mold is filled with the injected plastic, and a neck ring disposed to form, when the sleeve is retracted, an extension of the mold cavity and to confine the outer surface of the neck of the parison and means shifting said neck ring with the blow core and parison from said outer mold member to a blow station including a blow mold and means for expanding the parison into said blow mold to form a hollow article.

3. Apparatus as set forth in claim 2 in which the neck ring is disposed adjacent the upper end of the parison die and has a bore through which said sleeve passes.

4. Apparatus as set forth in claim 2 in which the neck ring is disposed in the lower end of said sleeve and is mounted to be retractable therewith as the parison die is filled with plastic.

5. Apparatus as set forth in claim 2 wherein said core is mounted on a stem having air passages, said stem terminating in an actuating cylinder, a fixed valve sleeve disposed around said stem, said valve sleeve and said blow core having coöperating shoulders adapted when separated to form a discharge port of said blow air communicating with said passages and a piston in said cylinder adapted to actuate said stem for opening and closing said discharge port.

6. Apparatus as set forth in claim 2 in which said pressure means comprises a fluid pressure cylinder and a piston operating therein connected to actuate said sleeve.

References Cited

UNITED STATES PATENTS

| | | | |
|---|---|---|---|
| 2,434,594 | 1/1948 | Schultz. | |
| 2,864,124 | 12/1958 | Strauss | 18—5 |
| 2,872,700 | 2/1959 | Knowles | 18—5 |
| 1,533,191 | 4/1925 | Kaiser et al. | 18—125 |
| 2,465,799 | 3/1949 | Gravesen | 264—328 |
| 3,124,841 | 3/1964 | Kaji | 18—30 |
| 3,170,971 | 2/1965 | Nineman | 264—97 |
| 2,936,489 | 5/1960 | Sherman | 264—97 |
| 3,111,711 | 11/1963 | Colombo | 18—5 |
| 3,112,522 | 12/1963 | Doyle | 18—5 |

FOREIGN PATENTS 1,106,868   7/1955   France.

WILBUR L. McBAY, *Primary Examiner.*

J. SPENCER OVERHOLSER, *Examiner.*